(12) United States Patent
Lee

(10) Patent No.: US 12,023,990 B2
(45) Date of Patent: Jul. 2, 2024

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Taewoo Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 848 days.

(21) Appl. No.: 17/088,373

(22) Filed: Nov. 3, 2020

(65) Prior Publication Data
US 2021/0309077 A1  Oct. 7, 2021

(30) Foreign Application Priority Data
Apr. 1, 2020  (KR) ................ 10-2020-0039521

(51) Int. Cl.
| | |
|---|---|
| *B60L 58/12* | (2019.01) |
| *B60H 1/00* | (2006.01) |
| *G05B 19/042* | (2006.01) |
| *G06Q 10/02* | (2012.01) |
| *G06Q 50/40* | (2024.01) |
| *G07C 5/08* | (2006.01) |
| *H02J 7/00* | (2006.01) |

(52) U.S. Cl.
CPC ..... *B60H 1/00964* (2013.01); *B60H 1/00742* (2013.01); *B60H 1/00878* (2013.01); *B60H 1/00985* (2013.01); *B60L 58/12* (2019.02); *G05B 19/042* (2013.01); *G06Q 10/02* (2013.01); *G06Q 50/40* (2024.01); *G07C 5/08* (2013.01); *G05B 2219/2614* (2013.01); *H02J 7/0047* (2013.01)

(58) Field of Classification Search
CPC ............ B60H 1/00964; B60H 1/00878; B60H 1/00828; B60H 1/00778; B60H 3/0085; B60H 1/00392; B60H 1/00385; B60L 58/12; B60L 1/04; G05B 19/042; G05B 2219/2614; G06Q 50/30; G07C 5/08; H02J 7/34; Y02T 10/70; Y02T 90/12
See application file for complete search history.

(56) References Cited

U.S. PATENT DOCUMENTS

| | | | | |
|---|---|---|---|---|
| 5,562,538 | A  * | 10/1996 | Suyama | ................ B60L 53/14 454/75 |
| 11,241,937 | B2 * | 2/2022 | Giesert | ................ B60H 1/008 |
| 2010/0318250 | A1 * | 12/2010 | Mitsutani | ................ B60L 50/61 320/109 |
| 2011/0067422 | A1 * | 3/2011 | Ichishi | ................ B60H 3/0085 62/176.1 |
| 2012/0047928 | A1 * | 3/2012 | Fukatsu | ................ B60L 53/68 307/9.1 |

(Continued)

*Primary Examiner* — Peter D Nolan
*Assistant Examiner* — Anwar Mohamed
(74) *Attorney, Agent, or Firm* — SLATER MATSIL, LLP

(57) ABSTRACT

A vehicle may include: a battery charged by a charging device; an air conditioner; and a controller configured to check whether the battery is being charged, and in response to checking that the battery being charged, apply power supplied from the charging device to the air conditioner. The air conditioner may preform an air blowing operation to execute an after-blow function using the applied power.

18 Claims, 5 Drawing Sheets

(56) References Cited

U.S. PATENT DOCUMENTS

| | | | | |
|---|---|---|---|---|
| 2013/0181679 | A1* | 7/2013 | Naylor | H02J 7/34 |
| | | | | 320/134 |
| 2015/0210140 | A1* | 7/2015 | Matsuoka | B60H 1/00849 |
| | | | | 165/203 |
| 2019/0337485 | A1* | 11/2019 | Sammarome | F21S 45/60 |
| 2020/0076225 | A1* | 3/2020 | Naylor | H02J 7/00 |
| 2023/0065178 | A1* | 3/2023 | Hou | B60K 6/26 |

* cited by examiner

VEHICLE AND METHOD OF CONTROLLING THE SAME

CROSS-REFERENCE TO RELATED APPLICATION

The present application claims priority to and the benefit of Korean Patent Application No. 10-2020-0039521, filed on Apr. 1, 2020, the disclosure of which is incorporated herein by reference in its entirety.

TECHNICAL FIELD

The present disclosure relates to a vehicle and a method of controlling the same.

BACKGROUND

An air conditioner is indispensable in vehicles due to hot weather in summer season.

However, frequent use of the air conditioner causes moisture to condense on an evaporator and a blower of a vehicle, which provides an optimal environment for mold to proliferate. Because of the mold, when the air conditioner is turned on, the odor of mold may leak out from the air conditioner. Therefore, some users operate the air conditioner of the vehicle in a blowing mode before arriving at the destination to dry relevant components, or install a privately made product for after-blow to automatically remove moisture when the ignition of the vehicle is turned off.

Conducting the air blowing operation before arriving at the destination to remove moisture in the vehicle is very cumbersome, and the user may feel hot and uncomfortable due to having to drive the vehicle in a blowing mode or stay in the vehicle after arrival.

There is no way to keep the after-blow turned on when the vehicle ignition is turned off because all control devices are powered off when the vehicle ignition is turned off. If the air conditioner blower operates after the vehicle ignition is turned off, the vehicle battery may be discharged, and keeping the ignition turned on to operate the after-blow is very burdensome to the user.

In addition, when a product with a function called 'after-blow' is privately used, additional costs are required and cumbersome installation works are required. In addition, it is a hassle for a user to directly turn on/off the power of the after-blow product.

SUMMARY

The present disclosure provides a method of executing an after-blow function of an electric vehicle using the power of a charging device during charge of the electric vehicle.

Additional aspects of the disclosure will be set forth in part in the description which follows and, in part, will be obvious from the description, or may be learned by practice of the disclosure.

It is an aspect of the disclosure to provide a vehicle including: a battery charged by a charging device; an air conditioner; and a controller configured to check whether the battery is being charged, and in response to the battery being charged, apply power supplied from the charging device to the air conditioner, wherein the air conditioner preforms an air blowing operation to execute an after-blow function using the applied power.

The vehicle may further include a display on which information related to the after-blow function is displayed, wherein the information related to the after-blow function may include information related to at least one of whether the after-blow function is executed, a first time, and a second time.

The controller, if a time between when the air conditioner is powered off and when the after-blow function is desired to be executed is within the first time, may control the air conditioner to perform the air blowing operation to execute the after-blow function.

The controller, in response to a user having not arrived at the vehicle in a reservation air-conditioning state according to a scheduled departure time of the vehicle, may control the air conditioner to perform the air blowing operation.

The controller may check whether a door of the vehicle is in a locked state to determine whether the user has arrived at the vehicle.

The controller may check whether an ignition of the vehicle is in an off state to determine whether the user has arrived at the vehicle.

The controller may control the air conditioner to be powered on before the scheduled departure time of the vehicle, and may control the air conditioner to be powered off and to perform the air blowing operation to execute the after-blow function when the scheduled departure time arrives, according to the reservation air-conditioning state.

The controller may control the air conditioner to automatically terminate the air blowing operation to terminate the after-blow function when the second time elapses.

It is another aspect of the disclosure to provide a method of controlling a vehicle, the method including: checking a charge state of a battery charged by a charging device; in response to determining that the battery is being charged, applying power supplied from the charging device to an air conditioner; and preforming, by the air conditioner, an air blowing operation to execute an after-blow function using the applied power.

The method may further include displaying which information related to the after-blow function.

The information related to the after-blow function may include information related to at least one of whether the after-blow function is executed, a first time, and a second time.

The after-blow function may be set by a user.

The method may include: checking a time between when the air conditioner is powered off and when the after-blow function is desired to be executed; and in response to the checked time being within the first time, controlling the air conditioner to perform the air blowing operation to execute the after-blow function.

The method may include: checking whether a user has arrived at the vehicle in a reservation air-conditioning state according to a scheduled departure time of the vehicle; and in response to the user having not arrived at the vehicle, controlling the air conditioner to perform the air blowing operation.

The checking of whether the user has arrived at the vehicle may include checking a lock state of a door of the vehicle to determine whether the user has arrived at the vehicle.

The checking of whether the user has arrived at the vehicle may include checking an off-state of an ignition of the vehicle to determine whether the user has arrived at the vehicle.

The method may include: controlling the air conditioner to be powered on before the scheduled departure time of the vehicle, and controlling the air conditioner to be powered off and perform the air blowing operation to execute the after-blow function when the scheduled departure time arrives.

The method may include controlling the air conditioner to automatically terminate the air blowing operation to terminate the after-blow function when the second time elapses.

DRAWINGS

These and/or other aspects of the disclosure will become apparent and more readily appreciated from the following description of the embodiments, taken in conjunction with the accompanying drawings of which:

DETAILED DESCRIPTION

Figure 1:
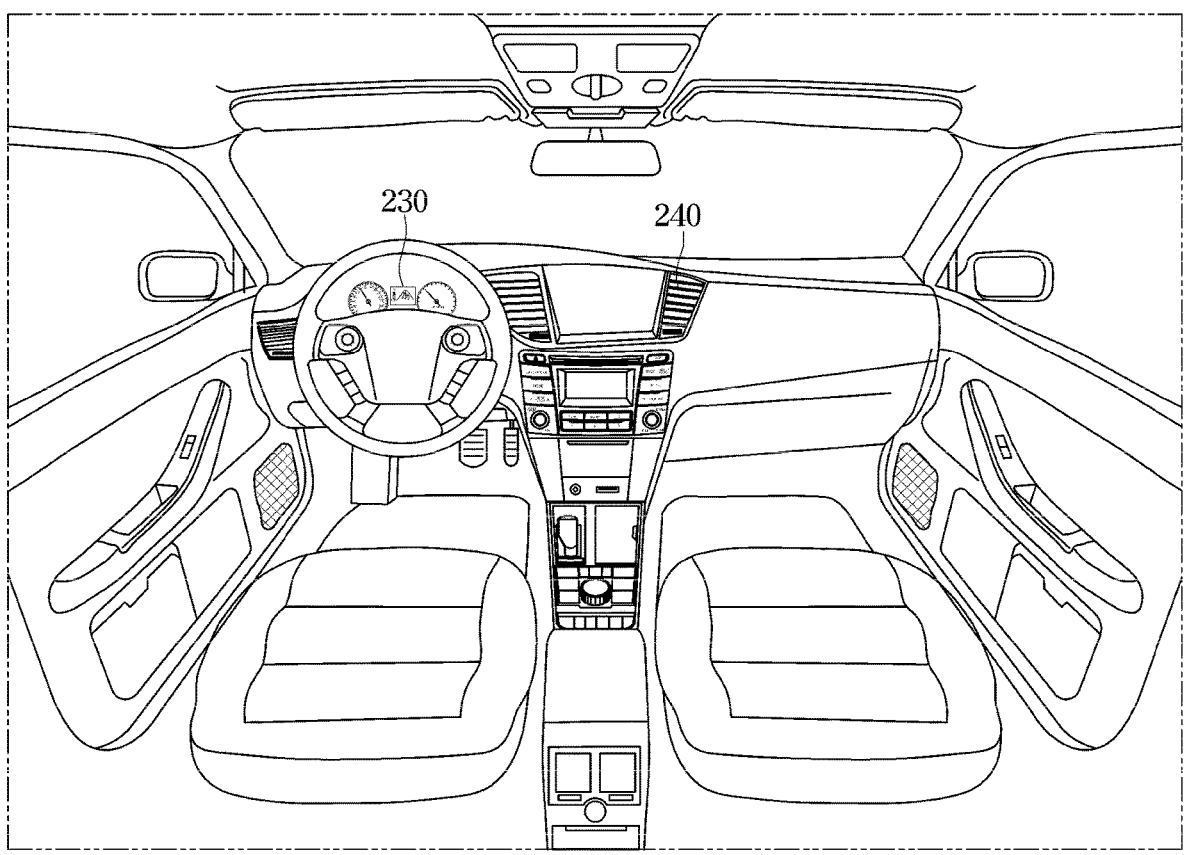
FIG. 1 is a view illustrating an interior configuration of a vehicle in one form of the present disclosure.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements.

In the description of an embodiment, it will be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

A vehicle disclosed in the present disclosure may be a hybrid vehicle, but is not limited thereto.

Hereinafter, a vehicle and a method of controlling the same in some forms of the present disclosure will be described with reference to the accompanying drawings.

FIG. 1 is a view illustrating an interior configuration of a vehicle 100 in some forms of the present disclosure.

Each component shown in FIG. 1 refers to a software element and/or a hardware component, such as Field Programmable Gate Array (FPGA) and Application Specific Integrated Circuit (ASIC).

In FIG. 1, a display 230 and an air conditioner 240 provided in the vehicle 100 are illustrated.

The display 230 may be a cluster or an audio video navigation (AVN), but is not limited thereto.

The vehicle 100 may be a conventional electric vehicle, and may remove moisture in the vehicle 100 by the air conditioner 240 automatically executing an after-blow function during charge of a battery of the vehicle 100. Here, the after-blow function may represent an air blowing operation performed by the air conditioner 240 to remove moisture in the vehicle 100.

In more detail, the after-blow function uses charging characteristics of the battery of the vehicle 100, and may refer to using the power of a charging device of the battery during charge of the battery of the vehicle 100, and controlling the power of the charging device to be applied to the air conditioner 240 such that an air blowing operation is performed by the air conditioner 240.

For example, while a user is executing battery charging at a rest area for rapid charging of the vehicle 100 for the next driving on a highway, the power of the battery charging device is applied to the air conditioner 240 such that the after-blow function is automatically executed.

Such a configuration obviates a need to execute an air blowing operation by the air conditioner 240 before starting the next driving in order to remove moisture generated from using the air conditioner 240 of the vehicle 100, thereby preventing a hassle in performing the air blowing operation.

Figure 2:
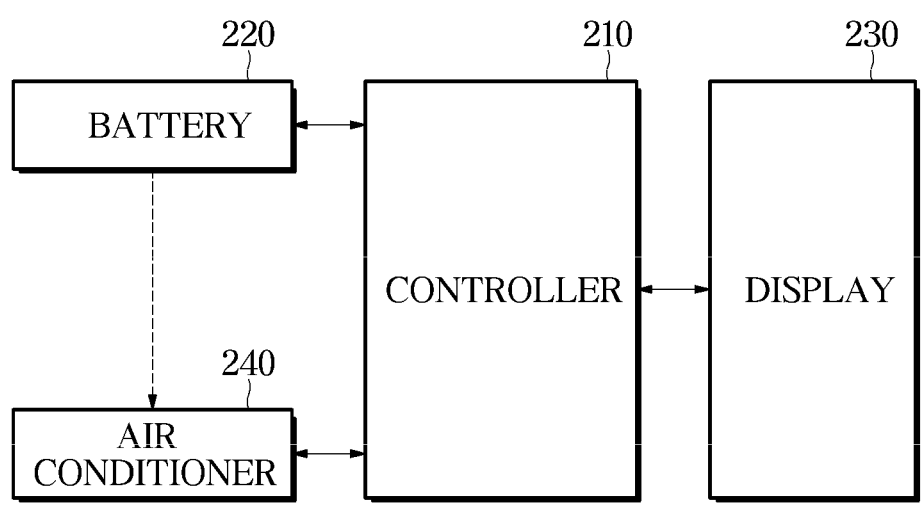
FIG. 2 is a control block diagram illustrating a vehicle in one form of the present disclosure.

FIG. 2 is a control block diagram illustrating the vehicle 100 in some forms of the present disclosure.

Referring to FIG. 2, the vehicle 100 in some forms of the present disclosure includes a battery 220 and a controller 210 that causes the power of the charging device to be applied to the air conditioner 240 during charge of the battery 220. The air conditioner 240 may perform an air blowing operation to execute the after-blow function. In addition, the vehicle 100 may include a display 230 that displays information about the after-blow function.

The controller 210 may check an operating state of the air conditioner 240 before ignition of the vehicle 100 is turned off.

If the air conditioner 240 has been operated, the controller 210 controls the charging device power of the battery 220 to be applied to the air conditioner 240 during charge of the battery 220 to remove the moisture so that the air conditioner 240 performs an air blowing operation to execute the after-blow function.

In addition, the controller 210 may automatically set the after-blow function such that the after-blow function is executed according to season, weather, and internal temperature of the vehicle 100 in connection with a Dual Automatic Temperature Control (DATC) device in the vehicle 100.

Accordingly, the user does not need to manually set the after-blow function every time.

In this case, the vehicle 100 may receive an input related to setting the after-blow function while driving, or even when the vehicle 100 is not driving, may receive an input related to setting the after-blow function when the vehicle 100 is in an ignition-on state.

The user may set whether to execute the after-blow function. In response to the user setting to execute the after-blow function, the user may additionally set a first time and an execution time of the after-blow.

Here, the first time may be a predetermined period of time from a time point at which the battery 220 starts charging after the air conditioner 240 of the vehicle 100 is powered off, during which the after-blow function is executable.

In more detail, the air conditioner 240 may check the time between when the air conditioner 240 is powered off and when the after-blow function is desired to be executed, and in response to the checked time being within the set first time, may perform an air blowing operation to execute the after-blow function.

In this case, the air conditioner 240, in response to the time between when the air conditioner 240 is powered off and when the after-blow function is desired to be executed being exceeding the set first time, may determine that it is difficult to remove moisture in the vehicle 100 and may not execute the after-blow function.

The second time may be a time taken to remove moisture in the vehicle 100 by execution of the after-blow function.

In more detail, the air conditioner 240, when the second time has elapsed since start of the air blowing operation to execute the after-blow function, may automatically terminate the air blowing operation to terminate the after-blow function.

The controller 210, in response to the user setting to execute the after-blow function, may perform control such the charging device power of the battery 220 is applied to the air conditioner 240 during charge of the battery 220 while the vehicle 100 is in an ignition-off state.

Here, if the vehicle 100 is not charging the battery 220 even in an ignition-off state of the vehicle 100, the charging device power of the battery 220 may not be used by the air conditioner 240, so that the air conditioner 240 may not execute the after-blow function.

In addition, the controller 210, in response to the user setting not to execute the after-blow function, may not allow the air conditioner 240 to execute the after-blow function even if the vehicle 100 is charging the battery 220 in an ignition-off state of the vehicle 100.

In addition, the controller 210, when the vehicle 100 having been in an ignition-off state during charge of the battery 220 is switched into an ignition-on state, may determine that the user exists inside the vehicle 100. In this case, the air conditioner 240 may not execute the after-blow function.

In addition, the controller 210 may check the power on/off state of the ignition of the vehicle 100 by checking whether the vehicle 100 is powered off.

The controller 210, in response to the ignition power of the vehicle 100 being in an off state, may determine that the vehicle 100 is powered off.

In addition, the controller 210 may check the power on/off state of the ignition IG3 by checking whether the battery 220 is being charged.

The controller 210, in response to the ignition IG3 power of the vehicle 100 being in a power on-state, may determine that the battery 220 is being charged.

In some forms of the present disclosure, in a reservation air conditioning state according to a scheduled departure time of the vehicle 100, if a user does not arrive on the scheduled departure time, the air conditioner 240 may perform an air blowing operation to execute the after-blow function.

The controller 210 may control the air conditioner 240 to be powered on before the scheduled departure time of the vehicle 100, and control the air conditioner 240 to be powered off when the scheduled departure time arrives, according to the reservation air conditioning state associated with the scheduled departure time.

In this case, in order to determine whether the user has not arrived at the vehicle 100, the controller 210 may check on/off state of the ignition of the vehicle 100, and lock/unlock state of the door of the vehicle 100.

In response to the vehicle 100 being in an ignition-off state or a door-lock state, the controller 210 may determine that the user has not arrived at the vehicle 100.

In response to determining that the user has not arrived at the vehicle 100, the air conditioner 240 may perform an air blowing operation to execute the after-blow function.

In response to determining that the user has arrived at the vehicle 100 during the execution of the after-blow function, the air conditioner 240 may automatically terminate the air blowing operation to terminate the after-blow function.

The controller 210 may include a memory (not shown) for storing data regarding an algorithm for controlling the operations of the components of the vehicle 100 or a program that represents the algorithm, and a processor (not shown) that performs the above described operations using the data stored in the memory. In this case, the memory and the processor may be implemented as separate chips. Alternatively, the memory and the processor may be implemented as a single chip.

The memory (not shown) may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like., but the implementation of the memory is not limited thereto. The memory may be a memory implemented as a chip separated from the processor, which has been described above in connection with the controller 210, or may be implemented as a single chip integrated with the processor.

The display 230 may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED), but is not limited thereto.

The display 230 may be a touch display.

The controller 210 may receive an input related to setting the after-blow function from a user through the display 230.

The battery 220 is a device that supplies power to a plurality of devices provided in the vehicle 100. The battery 220 may include a high voltage battery or a low voltage battery.

The high voltage battery may be a battery used for driving a vehicle, and the low voltage battery may be a battery used for a vehicle accessory, such as a radio, an air conditioner, and a navigation system, but is not limited thereto.

A battery control unit (not shown) is a Battery Management System (BMS) that optimizes the management of the battery to increase energy efficiency and extend the lifespan.

The battery control unit monitors battery voltage, current and/or temperature in real time and prevents excessive charging and discharging in advance, increasing battery safety and reliability. The battery control unit (not shown) may be configured in the battery.

Figure 3:
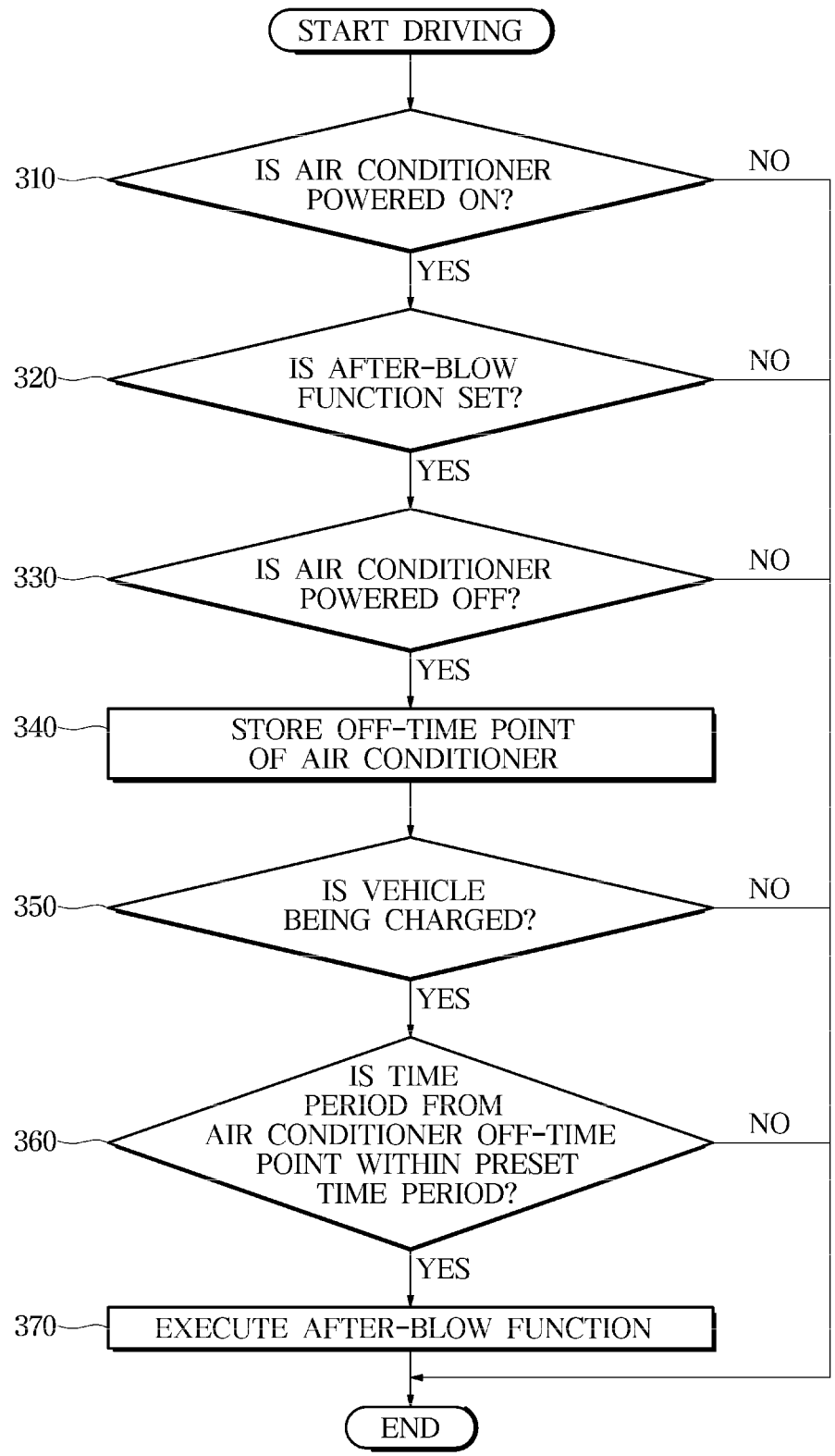
FIG. 3 is a flowchart for describing execution of an after-blow function of a vehicle in one form of the present disclosure.

FIG. 3 is a flowchart showing execution of an after-blow function of the air conditioner of the vehicle 100 in some forms of the present disclosure.

In FIG. 3, a method of executing the after-blow function of the vehicle 100 in a state of the battery 220 being charged once the vehicle 100 has driven.

Referring to FIG. 3, the controller 210 may check whether the air conditioner 240 is in a power-on state after the vehicle 100 has started driving (310).

In response to checking that the air conditioner 240 is in a power-on state, the controller 210 may check whether the after-blow function of the vehicle 100 is set to be executed (320).

In this case, the controller 210 may automatically set the after-blow function according to season, weather, and internal temperature of the vehicle 100 in connection with a DATC device in the vehicle 100.

In addition, the controller 210 may receive an input related to setting the after-blow function from the user through the display 230.

In this case, the display 230 may also display information about the after-blow function, and the information may be information related to at least one of whether the after-blow is executed, the first time, and the second time.

The controller 210 may check whether the air conditioner 240 is in a power-off state (330).

In response to checking that the air conditioner 240 is in a power-off state, the controller 210 may store a point in time at which the air conditioner 240 is powered off.

Here, the controller 210 may store the point in time at which the air conditioner 240 is powered off using a Real Time Clock (RTC) in the vehicle 100 (340).

The controller 210 may check whether the battery 220 of the vehicle 100 is being charged (350).

Here, in response to the ignition IG3 power of the vehicle 100 being in power on state, the controller 210 may determine that the battery 220 of the vehicle 100 is being charged.

In response to checking that the vehicle 100 is being charged, the controller 210 may check the time between when the air conditioner 240 of the vehicle 100 is powered off and when the after-blow function is desired to be executed, and check whether the checked time is within the first time (360).

In response to the checked time being within the set after-blow executable time, the air conditioner 240 may perform an air blowing operation to execute the after-blow function (370)

In response to the checked time exceeding the set first time, the air conditioner 240 may not execute the after-blow function.

For example, when the first time is set to 1 hour, and the time between when the air conditioner 240 of the vehicle 100 is powered off and when the after-blow function is desired to be executed is within 1 hour, the air conditioner 240 may perform an air blowing operation to execute the after-blow function.

In this case, the controller 210 may display a pop-up notifying the execution of the after-blow function on the display 230.

In addition, the controller 210 may not only notify the start of the after-blow execution, but may also display information about the after-blow function.

In response to the time between when the air conditioner 240 is powered off and when the after-blow function is desired to be executed exceeds 1 hour, the air conditioner 240 of the vehicle 100 may determines that it is difficult to remove moisture, and may not execute the after-blow function.

In the execution of the after-blow function, when the second time is reached, the air conditioner 240 may automatically terminate the air blowing operation to terminate the after-blow function.

For example, in a case in which the second time is set to 15 minutes, when 15 minutes elapses after initiation of the after-blow function, the air conditioner 240 may automatically terminate the air blowing operation to terminate the after-blow function.

Figure 4:
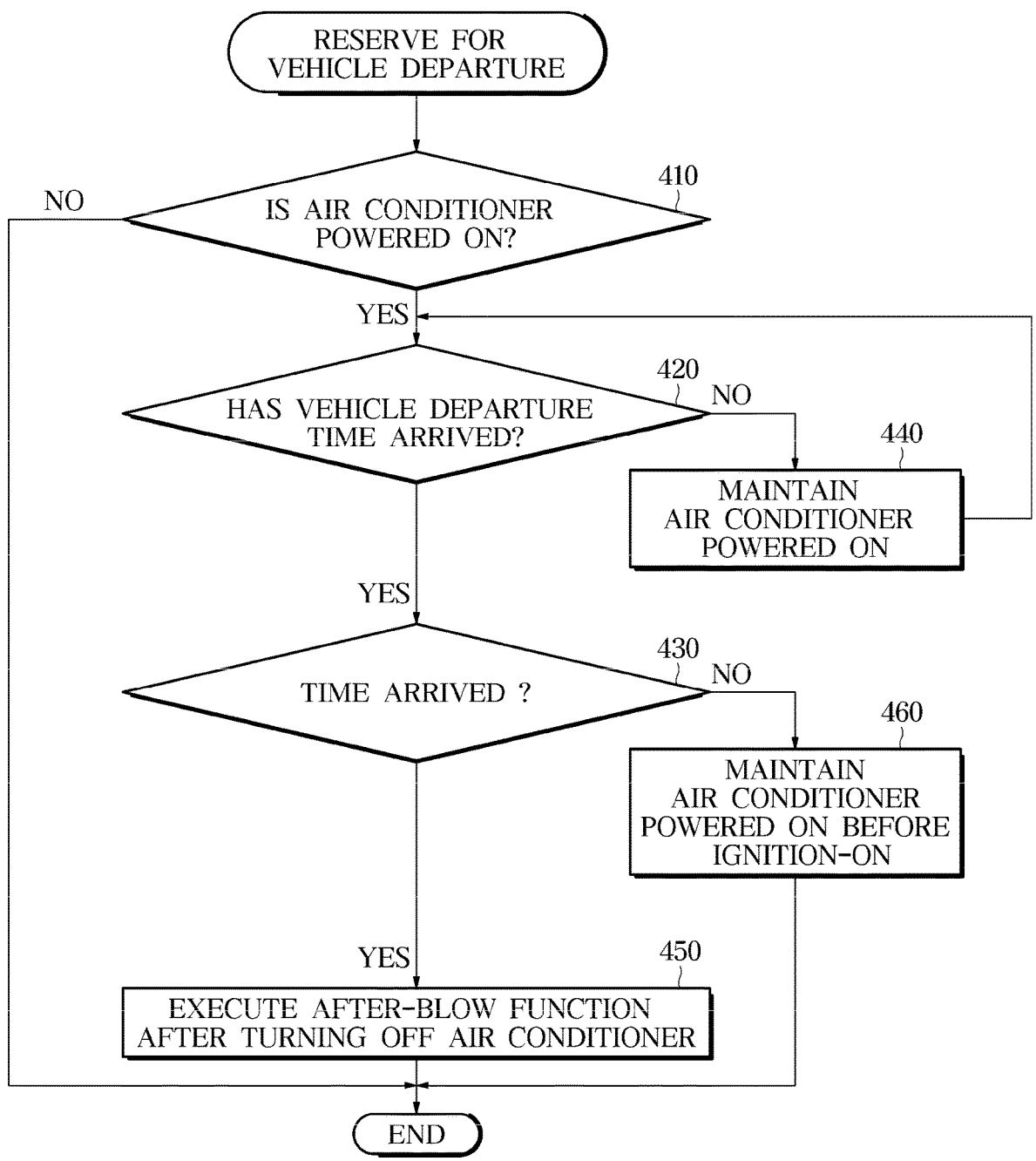
FIG. 4 is a flowchart for describing execution of an after-blow function of a vehicle in one form of the present disclosure.

FIG. 4 is a flowchart showing execution of an after-blow function of a vehicle in some forms of the present disclosure.

In FIG. 4, a method of executing an after-blow function of the vehicle 100 during charge of the battery 220 in reservation air-conditioning according to a scheduled departure time is shown.

Here, the reservation air conditioning state according to the scheduled departure time may be a state in which the battery 220 of the vehicle 100 is being charged.

Before the scheduled departure time of the vehicle 100, it may be checked whether the air conditioner 240 is in a power-on state (410).

For example, if the air conditioner 240 is set to enter a reservation air conditioning 30 minutes before the scheduled departure time, the air conditioner 240 may be automatically powered on 30 minutes before the scheduled departure time.

When the air conditioner 240 is in a power-on state, the controller 210 may check whether the scheduled departure time has arrived (420).

When the scheduled departure time has not arrived, the controller 210 may maintain the air conditioner 240 in the power-on state (440).

When the scheduled departure time has arrived, the controller 210 may check whether the user has not arrived at the vehicle 100 (430).

In more detail, in order to determine whether the user has arrived at the vehicle 100 or not, the controller 210 may check an ON/OFF state of the ignition of the vehicle 100, or a lock/unlock state of the door of the vehicle 100.

Based on the ignition-off state or the door-locked state of the vehicle 100, the controller 210 may determine that the user has not arrived at the vehicle 100.

In response to the user having not arrived at the vehicle 100, the controller 210 may turn off the power of the air conditioner 240, and the air conditioner 240 may perform an air blowing operation to execute the after-blow function (450).

In this case, the controller 210 may display a pop-up on the display 230 indicating the start of execution of the after-blow function.

In addition, the controller 210 may display at least one piece of information related to the after-blow function as well as the pop-up notifying the execution of the after-blow function.

Based on the vehicle 100 being in an ignition-on state or the door-unlocked state of the vehicle 100, the controller 210 may determine that the user has arrived on the scheduled departure time.

In response to the user having arrived at the vehicle 100, the air conditioner 240 may be maintained in the power-on state until the user turns on the ignition of the vehicle 100 (460).

Figure 5:
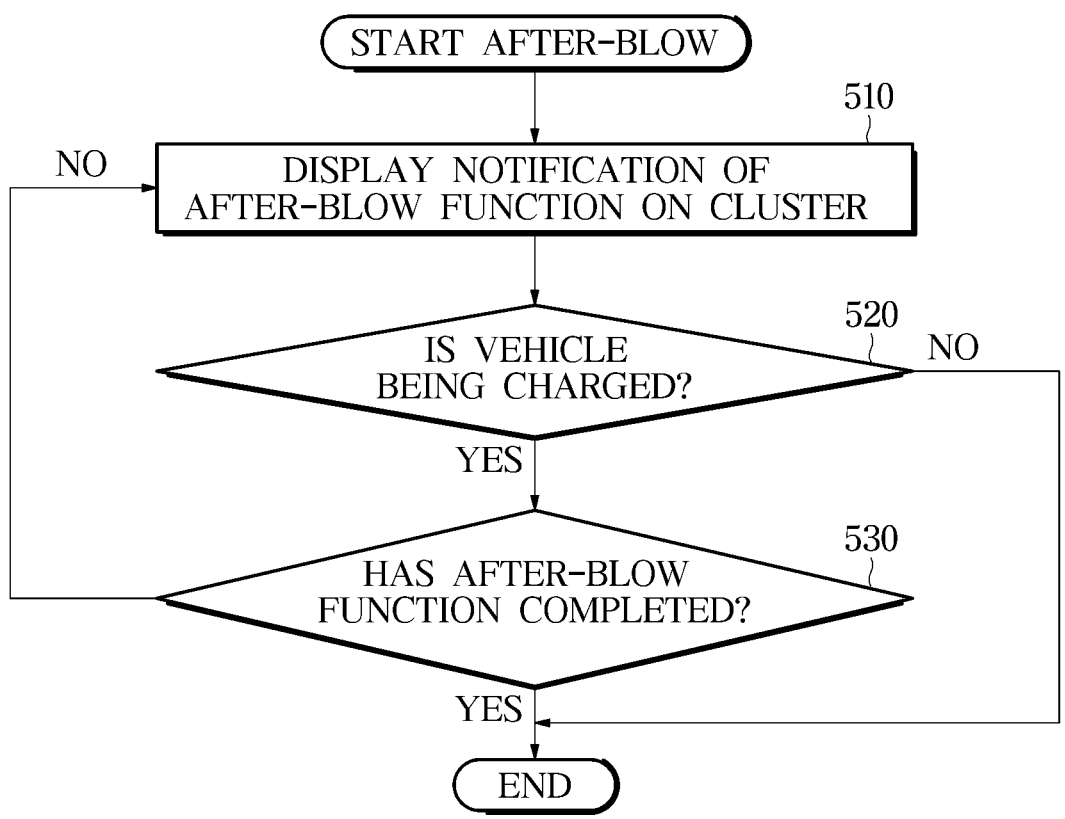
FIG. 5 is a flowchart for describing execution of an after-blow function of a vehicle in one form of the present disclosure.

FIG. 5 is a flowchart showing execution of an after-blow function of a vehicle in some forms of the present disclosure.

In FIG. 5, a method of executing the after-blow function in a state in which the vehicle 100 is charging the battery 220 once the after-blow function has started is shown.

Referring to FIG. 5, when the execution of the after-blow function starts, the controller 210 may display a pop-up for notifying execution of the after-blow function on the display 230.

In addition, the controller 210 may display at least one piece of information related to the after-blow function as well as the pop-up notifying that the execution of the after-blow function starts.

The display 230 is illustrated as a cluster, but is not limited thereto.

The controller 210 may check whether the vehicle 100 is being charged (520).

When it is checked that the vehicle 100 is being charged, the air conditioner 240 may perform an air blowing operation to execute the after-blow function.

With elapse of the second time, the controller 210 may check whether the execution of the after-blow function has been completed (530).

For example, in a case in which the after-blow execution time is set to 15 minutes, when 15 minutes elapses after the execution of the after-blow function starts, the air conditioner 240 may terminate the air blowing operation to terminate the after-blow function.

Without elapse of the second time, the after-blow function may be continuously executed until the second time elapses.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the electric vehicle executes the after-blow function using the power of the charging device during charge of a battery of the electric vehicle, thereby obviating a need to install additional hardware for removing moisture in the vehicle, thus preventing relevant costs from being incurred.

In addition, the after-blow function is automatically executed when charging the vehicle battery, thereby obviating a cumbersome for a user to directly turn on the power of the after-blow.

In addition, the after-blow function is automatically executed when charging the vehicle battery, so that other hardware does not need to operate, thereby ensuring the vehicle safety.

In addition, the after-blow function is executed using the power of the charging device when charging the vehicle battery, thereby preventing the vehicle from being discharged.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A vehicle comprising:
   a battery charged by a charging device;
   an air conditioner; and
   a controller configured to:
   check whether the air conditioner is in a power-on state during driving of the vehicle,
   in response to checking that the air conditioner is in the power-on state, check whether the battery is being charged when the air conditioner is powered off; and
   in response to checking that the battery is being charged, apply power supplied from the charging device to the air conditioner,
   wherein the air conditioner is configured to perform an air blowing operation to execute an after-blow function using the power.

2. The vehicle of claim 1, wherein the vehicle further comprises:
   a display on which information related to the after-blow function is displayed,
   wherein the information related to the after-blow function includes information regarding at least one of whether the after-blow function is executed a first time, or whether the after-blow function is executed a second time.

3. The vehicle of claim 1, wherein if a time between when the air conditioner is powered off and when the after-blow function is executed is within a first time, the controller is configured to control the air conditioner to perform the air blowing operation to execute the after-blow function.

4. The vehicle of claim 1, wherein when a user has not arrived at the vehicle in a reservation air-conditioning state according to a scheduled departure time of the vehicle, the controller is configured to control the air conditioner to perform the air blowing operation.

5. The vehicle of claim 4, wherein the controller is configured to:
   check whether a door of the vehicle is in a locked state to determine whether the user has arrived at the vehicle.

6. The vehicle of claim 4, wherein the controller is configured to:
   check whether an ignition of the vehicle is in an off state to determine whether the user has arrived at the vehicle.

7. The vehicle of claim 4, wherein the controller is configured to:
   control the air conditioner to be powered on before the scheduled departure time of the vehicle; and
   control the air conditioner to be powered off and to perform the air blowing operation to execute the after-blow function when the scheduled departure time is within a predetermined range, according to the reservation air-conditioning state.

8. The vehicle of claim 1, wherein the controller is configured to:
   control the air conditioner to automatically terminate the air blowing operation to end the after-blow function when a second time elapses.

9. A method of controlling a vehicle, the method comprising:
   checking whether an air conditioner is in a power-on state during driving of the vehicle;
   in response to checking that the air conditioner is in the power-on state, checking whether a battery is being charged when the air conditioner is powered off;

checking a charge state of the battery charged by a charging device;

in response to checking that the battery is being charged, applying power supplied from the charging device to the air conditioner; and performing, by the air conditioner, an air blowing operation to execute an after-blow function using the power.

10. The method of claim 9, wherein the method further comprises:

displaying information related to the after-blow function.

11. The method of claim 10, wherein the information related to the after-blow function includes information regarding at least one of whether the after-blow function is executed a first time, or whether the after-blow function is executed a second time.

12. The method of claim 9, wherein the method comprises:

setting the after-blow function by a user.

13. The method of claim 10, wherein the method further comprises:

checking a time between when the air conditioner is powered off and when the after-blow function is to be executed; and when the checked time is within a first time, controlling the air conditioner to perform the air blowing operation to execute the after-blow function.

14. The method of claim 9, wherein the method further comprises:

checking whether a user has arrived at the vehicle in a reservation air-conditioning state according to a scheduled departure time of the vehicle; and when it is checked that the user has not arrived at the vehicle, controlling the air conditioner to perform the air blowing operation.

15. The method of claim 14, wherein the checking of whether the user has arrived at the vehicle includes:

checking a lock state of a door of the vehicle to determine whether the user has arrived at the vehicle.

16. The method of claim 14, wherein the checking of whether the user has arrived at the vehicle includes:

checking an off-state of an ignition of the vehicle to determine whether the user has arrived at the vehicle.

17. The method of claim 14, wherein the method further comprises:

controlling the air conditioner to be powered on before the scheduled departure time of the vehicle; and controlling the air conditioner to be powered off and perform the air blowing operation to execute the after-blow function when the scheduled departure time is within a predetermined range.

18. The method of claim 9, wherein the method further comprises:

controlling the air conditioner to automatically terminate the air blowing operation to end the after-blow function when a second time elapses.

* * * * *